United States Patent
Iwasaki et al.

(10) Patent No.: US 7,315,401 B2
(45) Date of Patent: Jan. 1, 2008

(54) QUANTIZATION APPARATUS AND METHOD, AND INKJET PRINTING APPARATUS USING THE SAME

(75) Inventors: Osamu Iwasaki, Tokyo (JP); Naoji Otsuka, Kanagawa (JP); Minoru Teshigawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 10/417,088

(22) Filed: Apr. 17, 2003

(65) Prior Publication Data

US 2003/0197897 A1 Oct. 23, 2003

(30) Foreign Application Priority Data

Apr. 22, 2002 (JP) .............................. 2002-119342

(51) Int. Cl.
- H04N 1/40 (2006.01)
- G06K 9/38 (2006.01)

(52) U.S. Cl. .................. 358/3.03; 358/3.05; 358/3.22; 382/252

(58) Field of Classification Search ...... 358/3.03–3.05, 358/3.21, 3.22, 465, 466, 1.9; 382/251–252, 382/270

See application file for complete search history.

(56) References Cited

U.S. PATENT DOCUMENTS

| 6,061,145 A | 5/2000 | Kanda et al. ................ 358/1.9 |
| 6,757,079 B1 * | 6/2004 | Chen ........................ 358/3.05 |
| 6,943,918 B1 | 9/2005 | Kakutani |
| 2002/0051023 A1 | 5/2002 | Teshigawara et al. ......... 347/12 |

FOREIGN PATENT DOCUMENTS

| JP | 9-247446 | 9/1997 |
| JP | 2001-292321 | 10/2001 |
| JP | 2002-77608 | 3/2002 |

* cited by examiner

Primary Examiner—Scott A. Rogers
(74) Attorney, Agent, or Firm—Fitzpatrick, Cella, Harper & Scinto

(57) ABSTRACT

It is an object of this invention to provide a ternary or higher-order quantization method which avoids close gathering of pixels at a first output level. First and second threshold values Lth1 and Lth2 for ternarization and output values 0 (blank), 1, and 2 as converted output values are set to have a relationship of output value of 0 (blank)<first threshold value Lth1<second threshold value Lth2<output value of 1<output value of 2. This prevents a quantization error from becoming 0 when an input pixel value is an intermediate value, and prevents continuous outputting of only pixels having the output value of 1. When this image is printed, small ink dots corresponding to the output value of 1 are not easily continuously printed. This improves the image quality.

3 Claims, 11 Drawing Sheets

QUANTIZATION APPARATUS AND METHOD, AND INKJET PRINTING APPARATUS USING THE SAME

FIELD OF THE INVENTION

The present invention relates to a quantization apparatus and method of performing ternarization or higher-order multilevel conversion by using an error diffusion process of a multilevel image, and an inkjet printing apparatus using the same.

BACKGROUND OF THE INVENTION

An error diffusion process is widely used in image display apparatuses and printing apparatuses. This error diffusion process is particularly an important factor for the image quality of inkjet printing apparatuses. Present inkjet printing apparatuses are provided with techniques which express a plurality of gray levels for one pixel by discharging droplets having different sizes onto a sheet. Such techniques typically express three values or four values for a pixel. Three values are expressed by using two sizes of ink droplet, i.e., small and large droplets. Four values are expressed by using three sizes of ink droplet, i.e., small, medium and large droplets. To print images by using such inkjet printing apparatuses, error diffusion is used in converting a multilevel image into a ternary or quaternary image.

Ternarization in the conventional error diffusion is as follows. Two, first and second threshold values are prepared. Assuming that ternary outputs are 0, 1, and 2, if an input is smaller than the first threshold value, the output is 0 (a 0th output value); if an input is equal to or larger than the first threshold value and smaller than the second threshold value, the output is 1 (a first output value); and if an input is equal to or larger than the second threshold value, the output is 2 (a second output value).

To convert the output values of 0, 1, and 2 into pixel values of the input multilevel image data, the general approach is to convert the first output value whose output is 1 into ½ of a maximum value Lmax of the input, and convert the second output value whose output is 2 into the maximum value of the input. That is, output converted values obtained by converting output values into multilevels which input values can take are 0, (Lmax)/2, and Lmax with respect to 0, 1, and 2, respectively. This output converted value is also simply called an output value in some cases. Also, the general method is to set the first threshold value to ¼ the maximum value Lmax of the input and the second threshold value to ¾ the maximum value Lmax of the input, or to set the first threshold value to ⅓ the maximum value Lmax of the input and the second threshold value to ⅔ the maximum value Lmax of the input. The output converted values of the ternary outputs are called a 0th output converted value, first output converted value, and second output converted value.

That is, in conventional ternarization using error diffusion, the relationship between the threshold values and output converted values is (0th output converted value(=blank))<(first threshold value)<(first output converted value)<(second threshold value)<(second output converted value).

Likewise, in conventional quaternarization using error diffusion, the relationship between the output converted values and threshold values is (0th output converted value)<(first threshold value)< (first output converted value)<(second threshold value)<(second output converted value)<(third threshold value)<(third output converted value).

When an error diffusion process is performed by using the threshold values having the above relationship with the output values, no quantization error occurs for a uniform image for which an input value is equal to the first output converted value, so the output image is a uniform image having the first output value. That is, in the conventional relationship between the threshold values and output values, if an input value is equal to or smaller than the first threshold value, an image is formed by pixels having the first output value and blank pixels (the 0th output value), and, if an input value is larger than the first threshold value, an image is formed by pixels having the first output value and pixels having the second output value.

The purpose of this relationship between the threshold values and output values converted into multilevels is to minimize an error between the input level and output level of each pixel.

Unfortunately, when small droplets are used to print pixels having the first output value described above in an inkjet printing apparatus, the printing position accuracy (landing accuracy) of these small droplets becomes lower than that of large droplets. Therefore, unevenness readily occurs if an image is formed by densely gathering small droplets. Also, an error diffusion method forms a pseudo contour on an output image if the value of input data is slightly larger than the output converted value. That is, multilevel inkjet printing apparatuses sometimes deteriorate the image quality.

SUMMARY OF THE INVENTION

It is an object of the present invention to provide a quantization apparatus and method which are suited to a multilevel inkjet printing apparatus as described above, and which can form high-quality images by such a multilevel inkjet printing apparatus by avoiding dense gathering of those pixels having the first output value, which are formed using small droplets, and to provide an inkjet printing apparatus using the same.

To achieve the above object, the present invention has the following arrangement.

A quantization apparatus for performing a quantization process by using an error diffusion method comprises converting means for converting a pixel value of interest containing a dispersed error into an output value corresponding to a value range to which the pixel value of interest belongs, and dispersing means for dispersing, as an error, a difference between the output value converted by the converting means and the pixel value of interest to pixels near a pixel having the pixel value of interest, wherein the value range, except for a range including a maximum pixel value and a range including a minimum pixel value, does not contain any output value corresponding to the value range.

More preferably, the value range is obtained by dividing the pixel value into at least three ranges, and, except for the range including the maximum pixel value and the range including the minimum pixel value, an output value corresponding to the value range exceeds a maximum value of the value range.

More preferably, the value range is obtained by dividing the pixel value into three ranges, and an upper limit of one intermediate range is substantially intermediate between a lower limit of the intermediate range and an output value corresponding to the intermediate range.

In a quantization apparatus for quantizing image data by an N-level (N≧3) error diffusion method, first threshold value)<(second threshold value)<(first output value)<(second output value)

is set as a relationship between first and second threshold values.

More preferably, the second threshold value is substantially intermediate between the first threshold value and the first output converted value.

More preferably, ((n−2)th output value)<(nth threshold value)<((n−1)th output value)

(where n is an integer from 3 (inclusive) to N−1 (inclusive)).

More preferably, if an input value is equal to or smaller than a predetermined value, N-level conversion is performed, and, if an input value is larger than the predetermined value, (N−1)-level conversion is performed.

More preferably, the predetermined value is half the second output converted value.

More preferably, there is provided an inkjet printing apparatus for quantizing image data by any of the quantization apparatuses described above, and printing each pixel by ink droplets having at least two different sizes in accordance with an output value of the quantized image data.

A printing apparatus of the present invention comprises error diffusing means having multi-stage output values for one pixel, wherein in this error diffusing means, (first threshold value)<(second threshold value)<(first output converted value)<(second output converted value)

is set as a relationship between a plurality of threshold values and output converted values corresponding to the threshold values.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

<Arrangement of Inkjet Printing Apparatus>

Figure 8:
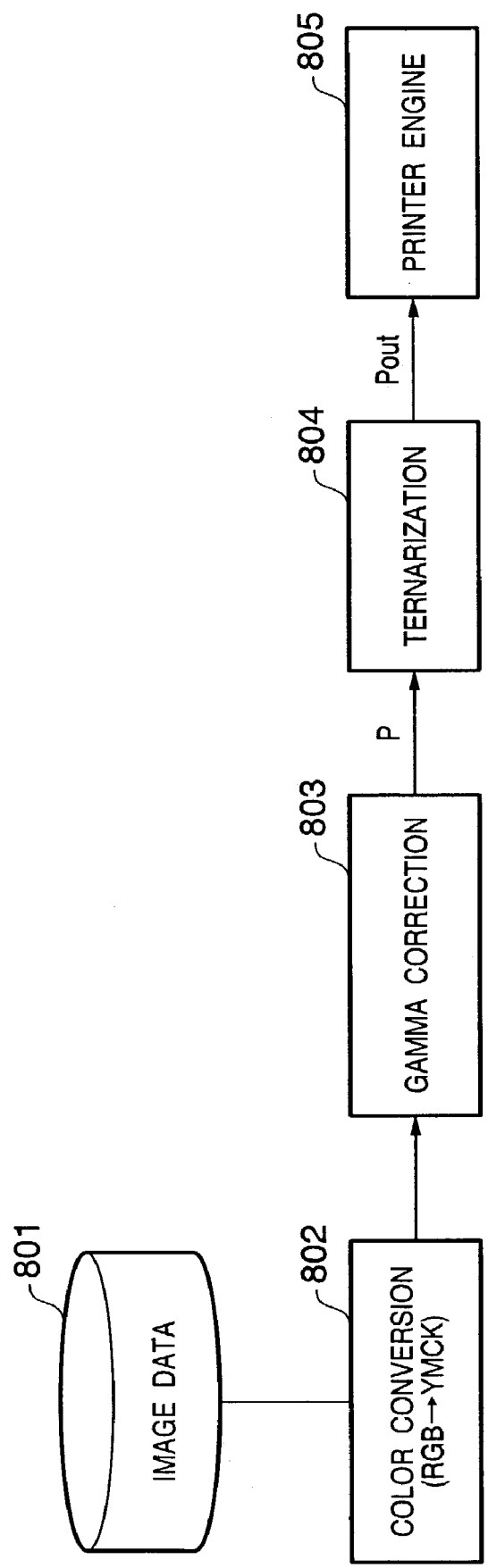
FIG. 8 is a block diagram of an inkjet printing apparatus according to the present invention.

Embodiments of the present invention will be described below with reference to the accompanying drawings. First, the arrangement of an inkjet printing apparatus is shown in FIG. 8. Referring to FIG. 8, a storage 801 stores multilevel image data received from a host computer or the like. This multilevel image data is later quantized into ternary or quaternary image data. Therefore, in this multilevel image data, one pixel is expressed by the number of gray levels exceeding the number of gray levels after the quantization. In the present invention, this multilevel image data is so-called full-color image data in which each of color components R, G, and B is expressed by 256 gray levels.

A color converter 802 converts the color space of color multilevel image data into YMCK as a color space expressed by inks of the inkjet printing apparatus. The color converter 802 also performs an undercolor removing process (UCR process).

A gamma converter 803 corrects image data so that input and output pixel values have a linear relationship, in accordance with the input/output characteristics of the inkjet printing apparatus.

Figure 2:
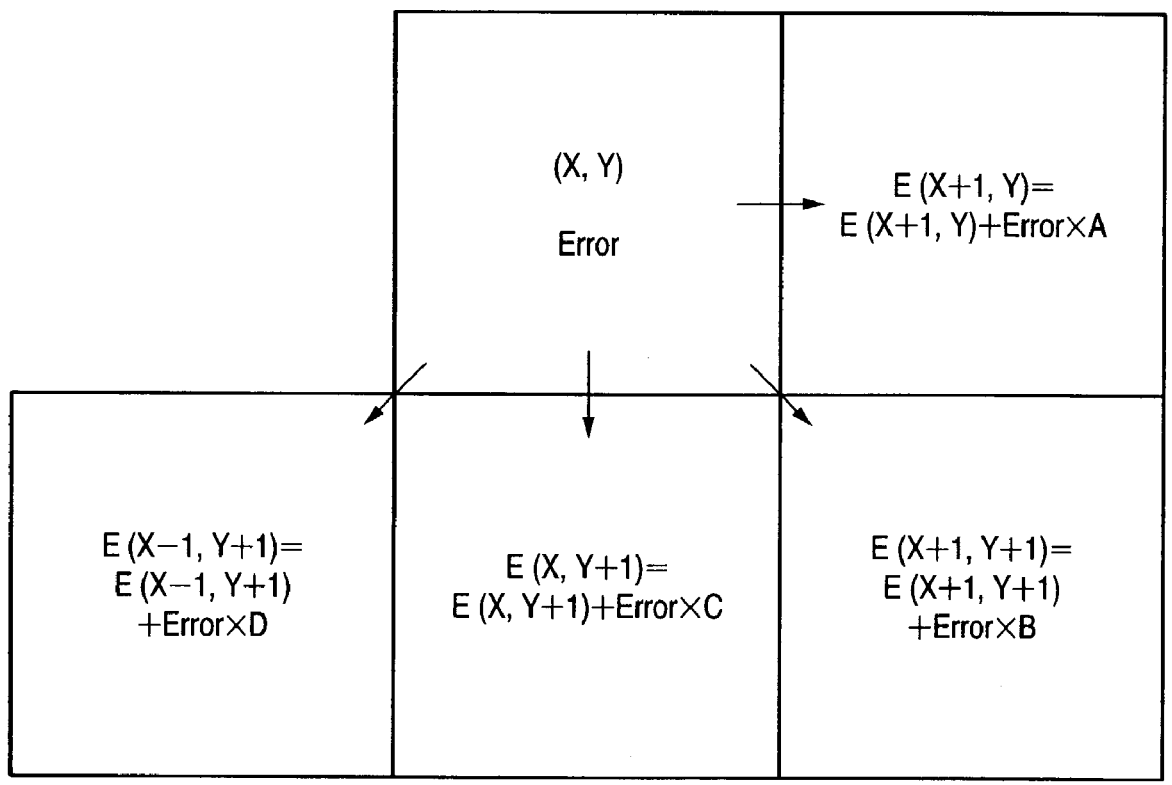
FIG. 2 is a view for explaining an example of distribution of an error to peripheral pixels in error diffusion used in the present invention.
Figure 3:
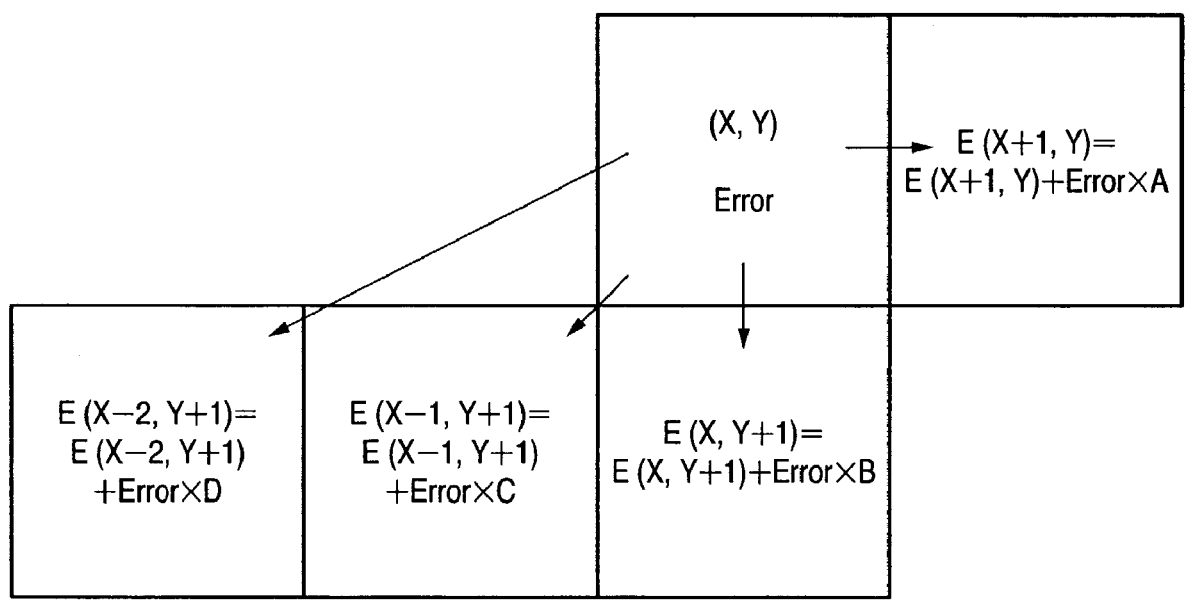
FIG. 3 is a view for explaining an example of distribution of an error to peripheral pixels in error diffusion used in the present invention.

A ternarization unit 804 quantizes multilevel image data into ternary data by using an error diffusion method. The ternarization unit 804 performs this quantization using error diffusion while moving a pixel of interest in raster scan order. Error diffusion has many variations as shown in FIGS. 2 and 3. Although an arrangement also depends on the way of diffusion used, assume that error diffusion is performed as shown in FIG. 2 in the present invention.

The quantized image data is input to a printer engine 805, and ink droplets corresponding to the values of individual pixels are discharged in accordance with the positions of these pixels. Consequently, this image data is formed as an image on a sheet of paper.

Figure 9:
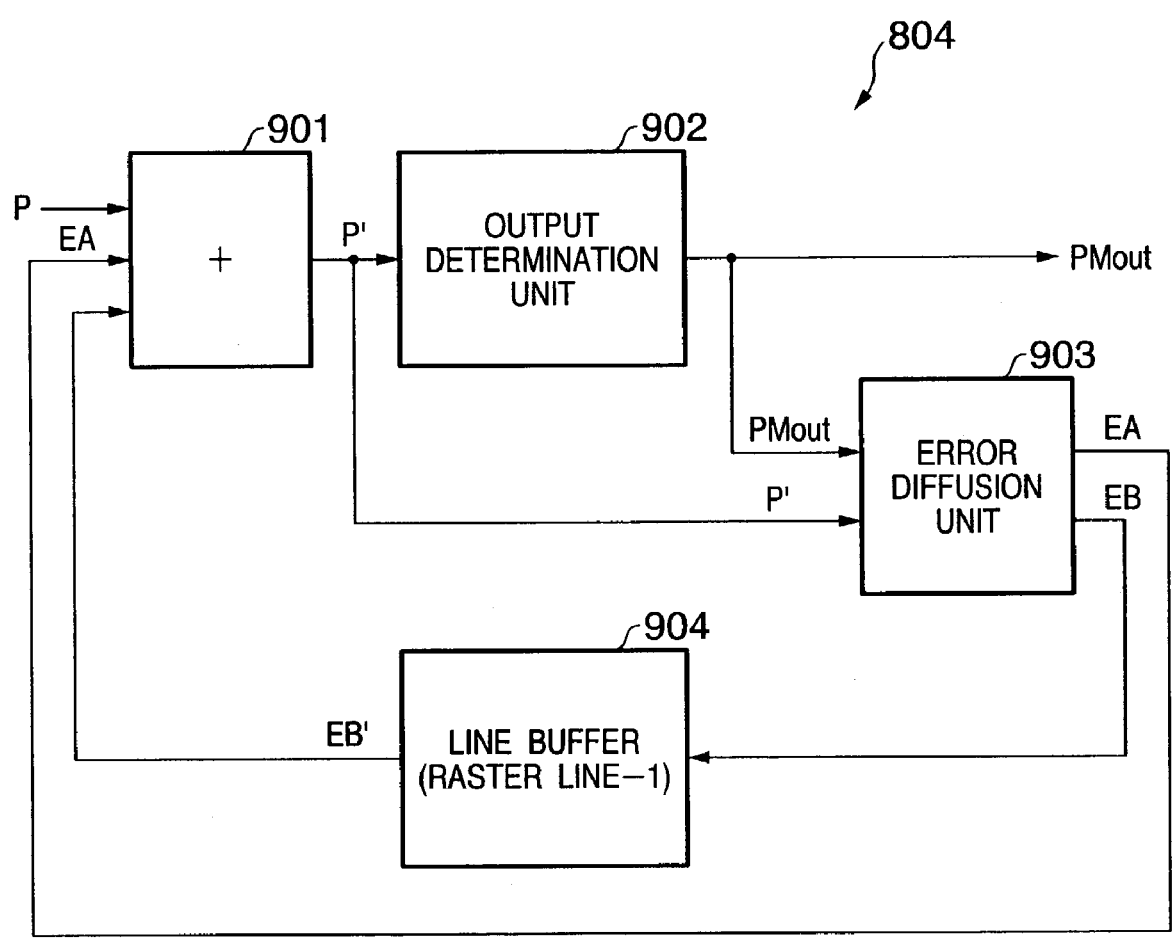
FIG. 9 is a block diagram of a ternarization unit of the inkjet printing apparatus according to the present invention.

FIG. 9 is a block diagram showing the internal arrangement of the ternarization unit 804. An adder 901 calculates P' by adding, to an input pixel of interest P, an error EA distributed from an immediately preceding pixel and an error sum EB' distributed from an immediate upper pixel on an immediately preceding line and from pixels before and after this pixel.

Figure 5:
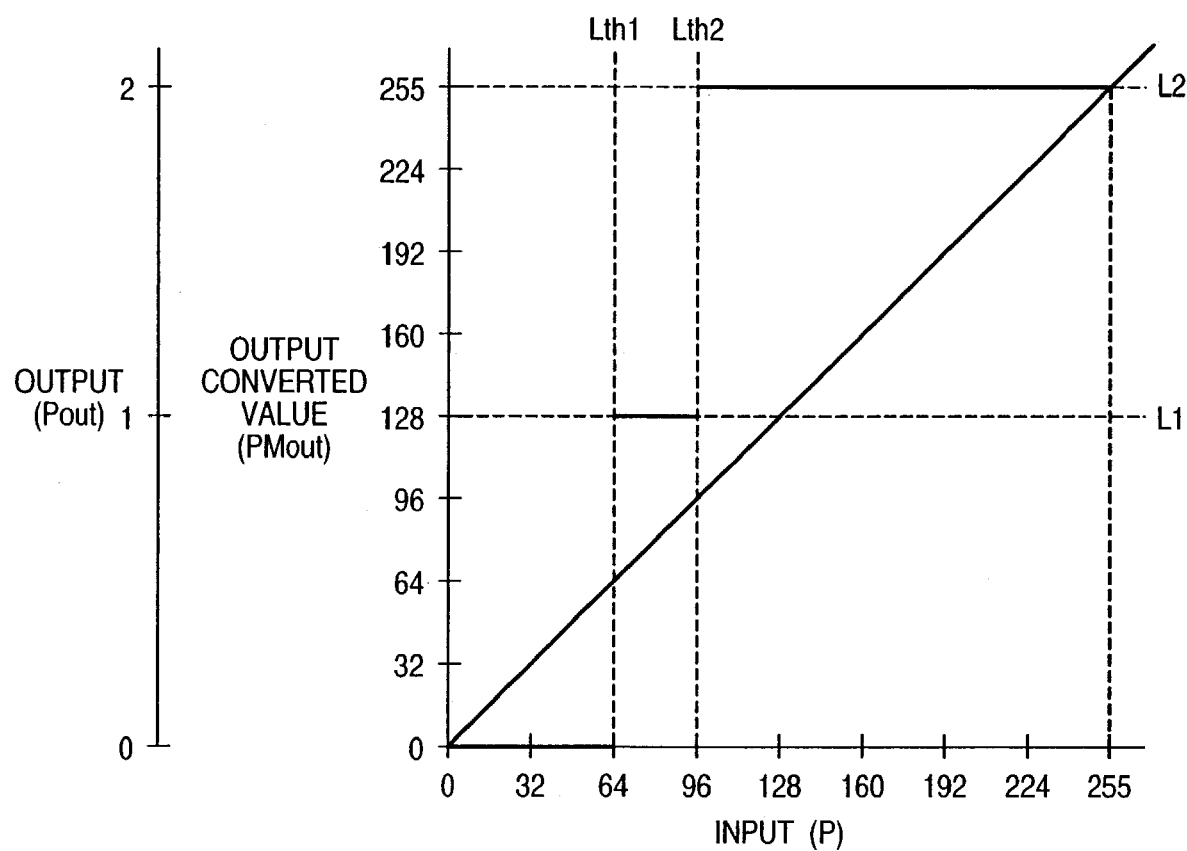
FIG. 5 is a graph for explaining the input-output relationship according to the present invention.

An output determination unit 902 acquires an output value PMout related to the input value P' from an LUT shown in FIG. 5 which defines the correspondence between input and output values, and outputs the acquired output value PMout. Note that the output value PMout can also be acquired by comparing a threshold value defined beforehand with the input value P', as in a procedure shown in FIG. 1 to be described later.

An error diffusion unit 903 outputs an error EA by distributing the difference between the output PMout and the input value P', to which the errors are already added, to a pixel immediately after the pixel of interest in accordance with a predetermined ratio. At the same time, the error diffusion unit 903 calculates an error to be distributed to a pixel which is on a line immediately after the line of the pixel of interest and which is immediately below the pixel of interest, and errors to be distributed to pixels before and after this pixel, thereby outputting a value EB to which an error to be distributed to one pixel is added. The error EB is a value obtained by adding errors distributed to a certain pixel of interest from a pixel immediately above the pixel of interest and from pixels before and after this pixel immediately above the pixel of interest. The output EA is input to the adder 901. The output EB is once stored in a line buffer 904 for storing (the number of pixels on one raster line—1) pixels, and input to the adder 901 in fast-in fast-out order. Consequently, as shown in FIG. 2, the output P' from the adder 901 has a pixel value to which errors are distributed from peripheral pixels.

Figure 10:
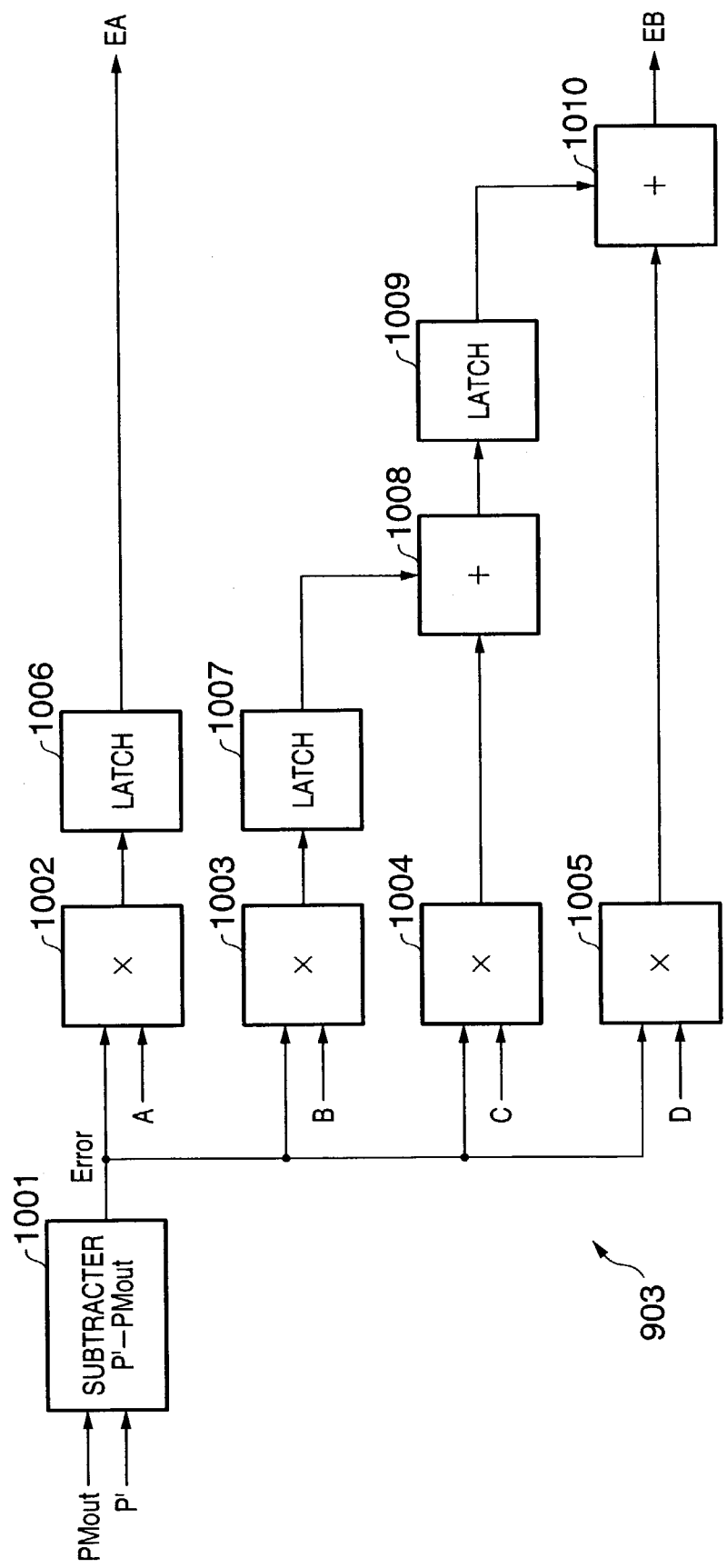
FIG. 10 is a block diagram of an error diffusion unit of the inkjet printing apparatus according to the present invention.

FIG. 10 is a block diagram showing the arrangement of the error diffusion unit 903. A subtracter 1001 receives the output value PMout and input value P', and calculates a difference Error. This output value is converted into a gray level of the input image data. Multipliers 1002, 1003, 1004, and 1005 multiply the difference Error by diffusion coefficients (distribution ratios) A, B, C, and D, respectively. The value multiplied by the diffusion coefficient A is output after being delayed one pixel by a latch 1006, so as to be added as an error EA to a pixel immediately after the pixel of interest. The value multiplied by the diffusion coefficient B is input to a latch 1007 so as to be added to a pixel (lower right pixel) immediately below and immediately after the pixel of interest. This value is then input to a latch 1009, so the value is delayed two pixels in total. The value multiplied by the diffusion coefficient C is added to the output from the latch 1007 by an adder 1008, and the sum is input to the latch 1009 and delayed one pixel so as to be added to a pixel immediately below the pixel of interest. The value multiplied by the diffusion coefficient D is input to an adder 1010 so as to be added to a pixel (lower left pixel) immediately below and immediately before the pixel of interest. As a consequence, the adder 1010 adds up the errors distributed from three consecutive pixels to one pixel on a line immediately below. This value is input as an error EB to the line buffer 904.

Figure 11:
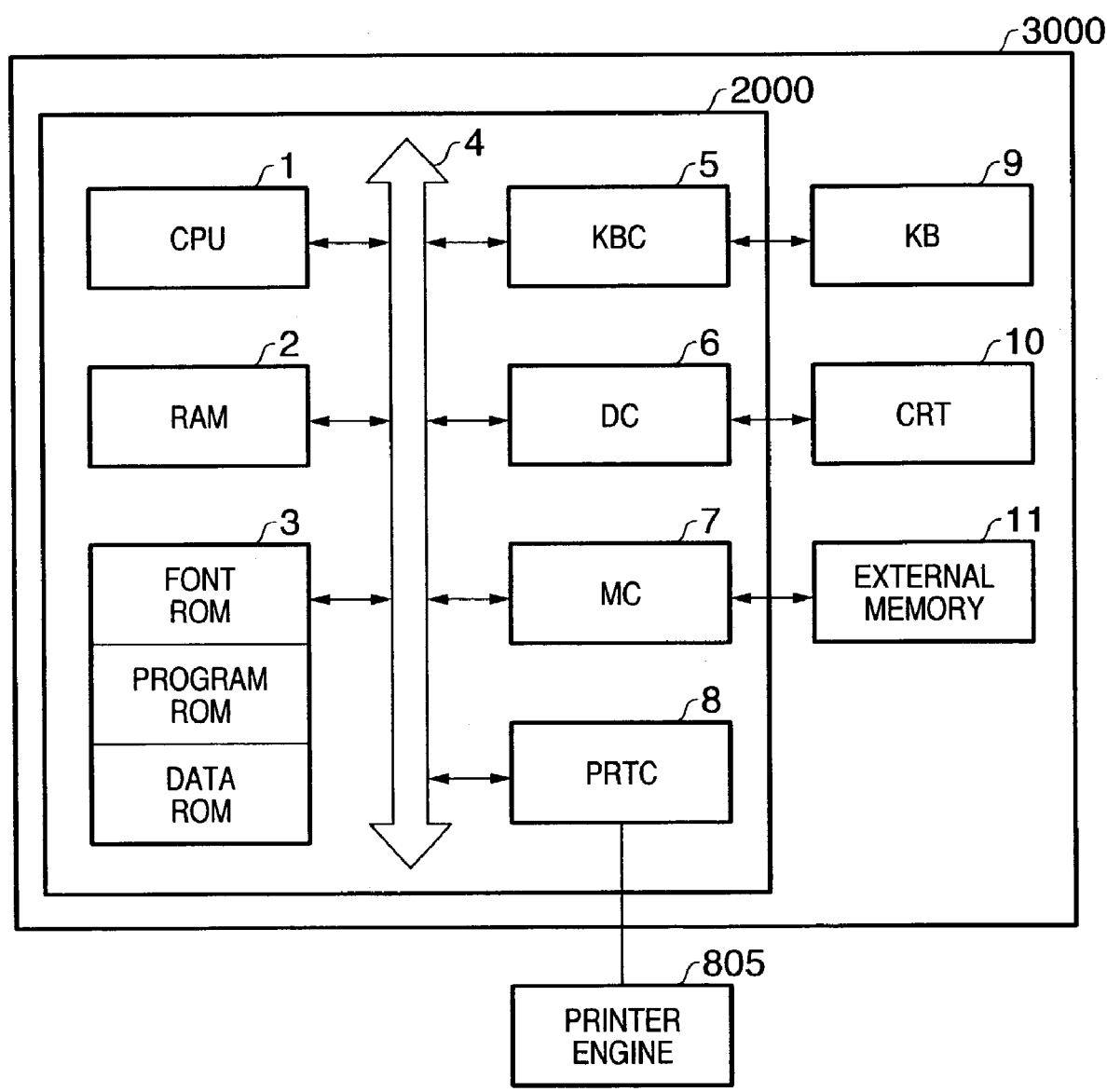
FIG. 11 is a block diagram of a control computer of the inkjet printing apparatus according to the present invention.

FIG. 11 shows the arrangement of a computer for realizing the storage 801, color converter 802, gamma converter 803, and ternarization unit 804 (to be collectively referred to as an image processor hereinafter) shown in FIG. 8, particularly, the ternarization unit 804 as will be described later. Although the image processor shown in FIG. 8 is in many instances realized by hardware as shown in FIGS. 9 and 10, this image processor can also be realized by software by using a computer.

Referring to FIG. 11, a computer 3000 includes a CPU 1 which executes image processing such as quantization on the basis of an image processing program (to be described later) or the like stored in a program ROM of a ROM 3 or in a RAM 2. The CPU 1 comprehensively controls devices connected to a system bus 4. The RAM 2 functions as a main memory, work area, and the like of the CPU 1. A keyboard controller (KBC) 5 controls key input from a keyboard 9 such as a touch panel. A display controller (DC) 6 controls display on a liquid crystal panel display 10. A disk controller (DKC) 7 controls access to an external memory 11 such as a hard disk (HD) or floppy disk (FD) storing a boot program, various applications, font data, user files, edit files, and the like. However, many built-in computers of printers have no hard disk. A printer controller (PRTC) 8 is connected to the printer engine 805 via a predetermined interface 21, and executes a communication control process, e.g., transmits image data to the printer 805.

The procedure of image processing explained in the present invention is executed by the above arrangement.

First Embodiment

Figure 1:
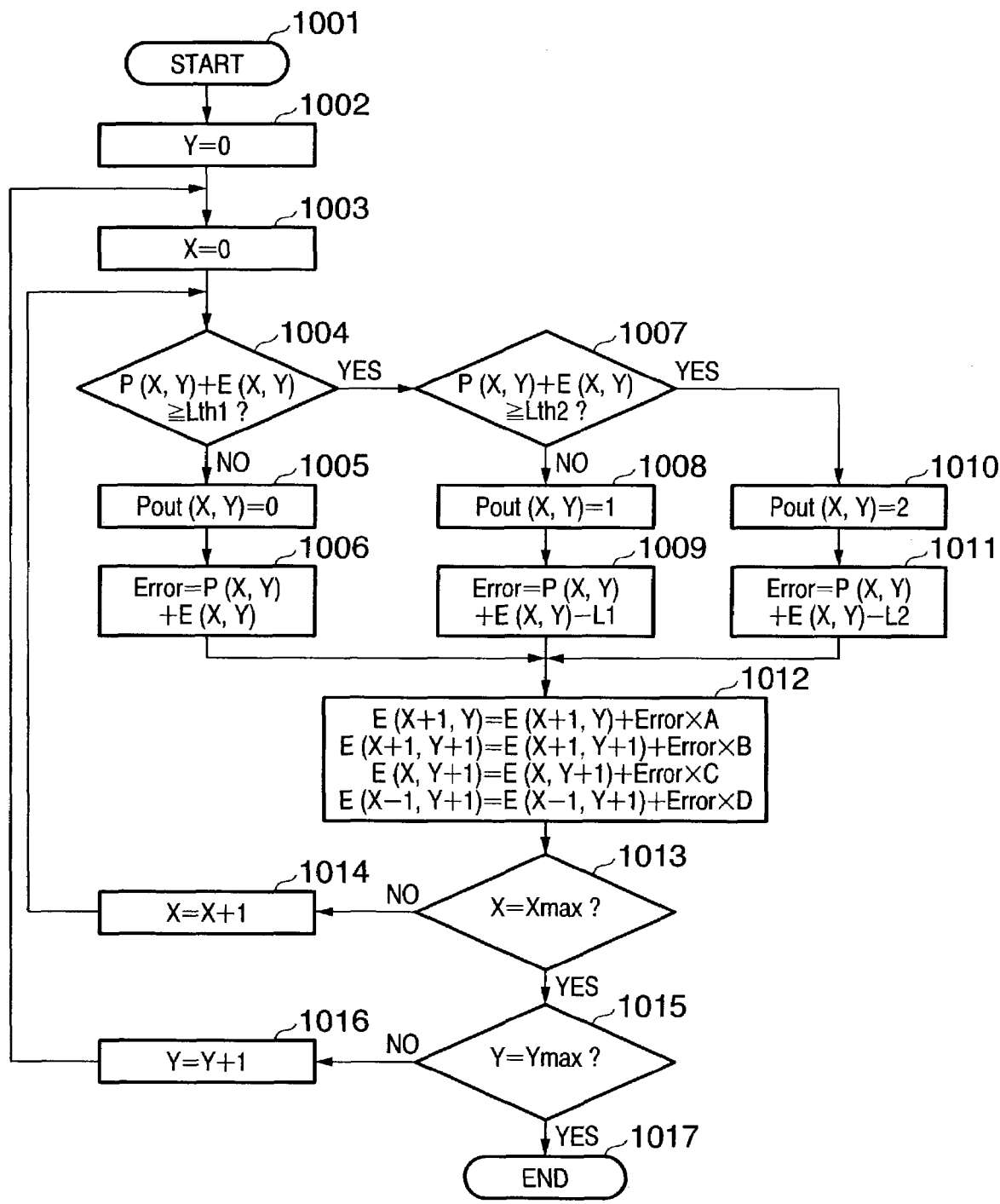
FIG. 1 is a flow chart for explaining the algorithm of ternarization used in the first embodiment of the present invention.

FIG. 1 is a flow chart for explaining the algorithm of ternarization according to the present invention.

In an image processed by this algorithm, each pixel is represented by an X-coordinate in the horizontal direction and a Y-coordinate in the vertical direction. The upper left corner of the image is an origin $(X,Y)=(0,0)$, and the lower right corner of the image is $(X,Y)=(Xmax,Ymax)$. That is, as the position of a pixel moves rightward, the value of X increases; as the position of a pixel moves downward, the value of Y increases.

The pixel level of an image to be processed is represented by $P(X,Y)$, and the pixel level of each pixel of a ternary image is represented by $Pout(X,Y)$. $P(X,Y)$ is the value of any of 256 gray levels which are limits a human can visually discriminate, and is expressed by an integer from 0 to 255. $Pout(X,Y)$ is the output value of any of three gray levels, and is expressed by 0, 1, or 2.

Letting Lth1 be a first threshold value used in ternarization using error diffusion, and Lth2 be a second threshold value. Letting L1 be an output converted value obtained by converting value of 1 which is output by ternarization into a gray level of input data, and L2 be an output converted value obtained by converting value of 2 which is output by ternarization into a gray level of input data. Also, an error distributed to each pixel is $E(X,Y)$.

Distribution ratios when errors are distributed to peripheral pixels by error diffusion are A for a right pixel, B for a lower right pixel, C for a lower pixel, and D for a lower left pixel.

Referring to FIG. 1, the process is started in step 1001. In step 1002, the Y-coordinate of a pixel of interest to be processed is set to 0, i.e., the upper end. In step 1003, the X-coordinate of the pixel of interest is set to, i.e., the left end of the image. In step 1004, the pixel to be processed is compared with the first threshold value used in ternarization. In this comparison, a value obtained by adding a pixel level $P(X,Y)$ of the pixel of interest and an error $E(X,Y)$ occurring in ternarization of peripheral pixels is compared with the first threshold value Lth1 used in ternarization by $$P(X,Y)+E(X,Y) \geq Lth1 \qquad (1)$$

If the value of inequality (1) is false, the flow advances to step 1005. In step 1005, the output $Pout(X,Y)$ of ternarization is set to 0 since the pixel level containing errors of peripheral pixels of the pixel to be processed is smaller than the first threshold value. The flow then advances to step 1006, and the error Error produced in this pixel is set to $P(X,Y)+E(X,Y)$. After that, the flow advances to step 1012.

On the other hand, if inequality (1) is found to be true in step 1004, the flow advances to step 1007. In step 1007, the pixel of interest is compared with the second threshold value used in ternarization. In this comparison, a value obtained by adding the pixel level $P(X,Y)$ of the pixel of interest and the error $E(X,Y)$ produced by ternarization of peripheral pixels is compared with the second threshold value Lth2 used in ternarization by $$P(X,Y)+E(X,Y) \geq Lth2 \qquad (2)$$

If the value of inequality (2) is false, the flow advances to step 1008. The flow thus advances to step 1008 if the pixel level obtained by adding the quantization errors of the pixel of interest and peripheral pixels is equal to or larger than the first threshold value and smaller than the second threshold value. Accordingly, the output Pout(X,Y) obtained by ternarization is set to 1 in step 1008. The flow then advances to step 1009, and the quantization error Error produced by quantization of the pixel of interest is given by P(X,Y)+E(X,Y)−L1. After that, the flow advances to step 1012. Note that L1 is the first output converted value obtained by converting an output value "1" into the gray level of the input pixel.

If the value of inequality (2) is true, the flow advances to step 1010. The flow thus advances to step 1010 if the pixel level obtained by adding the quantization errors of the pixel of interest and peripheral pixels is equal to or larger than the second threshold value. Accordingly, the output Pout(X,Y) obtained by ternarization is set to 2. The flow then advances to step 1011, and the quantization error Error produced by quantization of the pixel of interest is given by P(X,Y)+E(X,Y)−L2. After that, the flow advances to step 1012. Note that L2 is the second output converted value obtained by converting an output value "2" into the gray level of the input pixel.

In step 1012, the quantization error of the pixel of interest is distributed to the peripheral pixels in accordance with $$E(X+1,Y)=E(X+1,Y)+\text{Error}\times A \quad (3)$$

$$E(X+1,Y+1)=E(X+1,Y+1)+\text{Error}\times B \quad (4)$$

$$E(X,Y+1)=E(X,Y+1)+\text{Error}\times C \quad (5)$$

$$E(X-1,Y+1)=E(X-1,Y+1)+\text{Error}\times D \quad (6)$$

Equation (3) gives an error to be distributed to the pixel on the right of the pixel to be processed.

Equation (4) gives an error to be distributed to the lower right pixel of the pixel to be processed.

Equation (5) gives an error to be distributed to the pixel below the pixel to be processed.

Equation (6) gives an error to be distributed to the lower left pixel of the pixel to be processed.

That is, this error diffusion process in step 1012 is as shown in FIG. 2.

In this embodiment, the quantization error distribution ratios A, B, C, and D are $A=7/16$, $B=1/16$, $C=5/16$, and $D=3/16$. Error diffusion in this embodiment well achieves its effect even at other distribution ratios, as long as $A+B+C+D=1$.

After step 1012, the flow advances to step 1013. In step 1013, whether pixels on one scan line are completely processed is determined by determining whether the X-coordinate of the pixel of interest is Xmax which indicates a pixel on the right end. If it is determined in step 1013 that the X-coordinate of the pixel of interest has not reached the right end, the flow advances to step 1014. In step 1014, a pixel in a position shifted one pixel to the right of the current pixel of interest is designated as the next pixel of interest, and the flow returns to step 1004.

If it is determined in step 1013 that the X-coordinate of the pixel of interest has reached the right end, the flow advances to step 1015. In step 1015, whether pixels in the whole region of the image are completely processed is determined by determining whether the Y-coordinate of the pixel of interest is Ymax which indicates a pixel on the lower end. If it is determined in step 1015 that the Y-coordinate has not reached the lower end, the flow advances to step 1016. In step 1016, a scan line below the scan line including the current pixel of interest is designated as the next scan line of interest, and the flow returns to step 1003. If it is determined in step 1015 that the Y-coordinate of the pixel of interest has reached the lower end, this means that the whole image region is completely quantized. Therefore, the flow advances to step 1017 to complete the ternarization process.

The ternarization algorithm of the error diffusion method described above is a general algorithm.

In the error diffusion process according to the present invention, the relationship between the two threshold values Lth1 and Lth2 and the two output converted values L1 and L2 in the above algorithm is important.

In this embodiment, the first output converted value L1 is 127, the second output converted value L2 is 255, the first threshold value Lth1 is 64, and the second threshold value Lth2 is 96.

Figure 4:
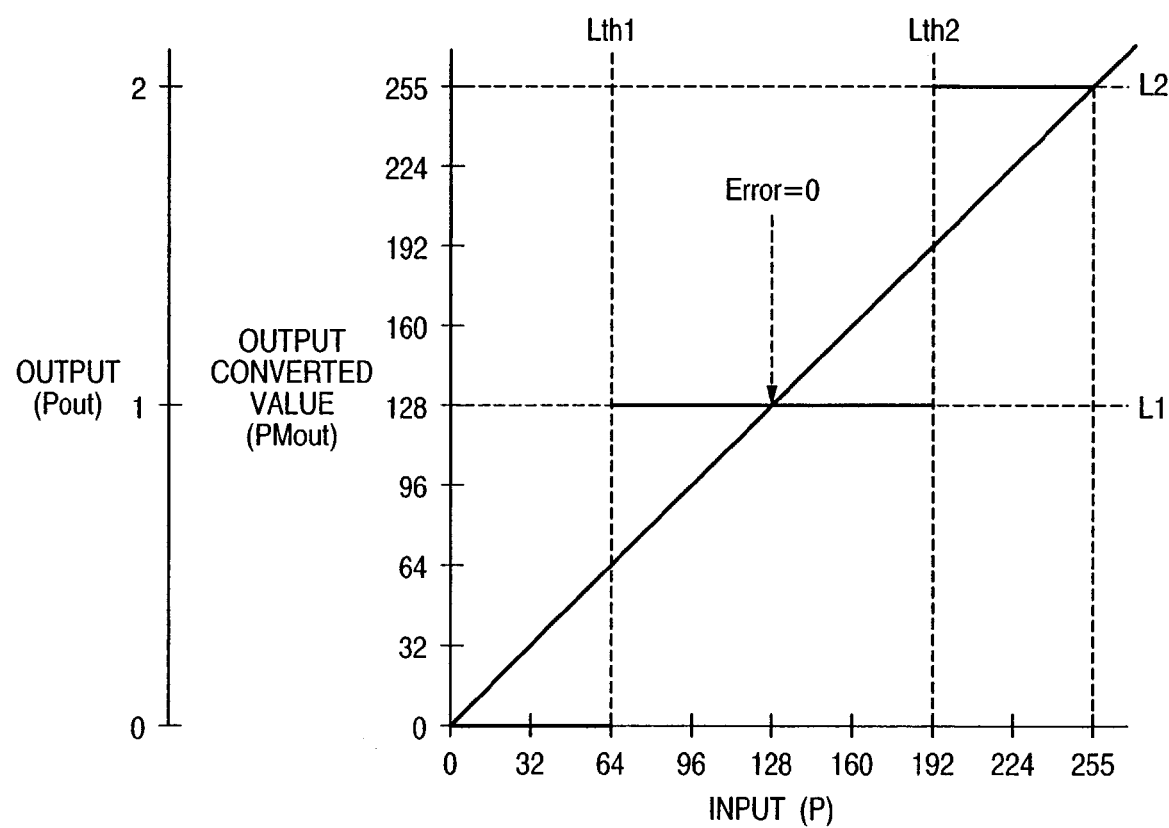
FIG. 4 is a graph for explaining the input-output relationship according to the prior art.

FIG. 5 is a graph showing the input-output relationship of set values in this embodiment. FIG. 4 is a graph showing an example obtained by conventional set values. Referring to FIG. 4, two output converted values L1 and L2 and a first threshold value Lth1 are the same as in this embodiment, and a second threshold value Lth2 is 192.

Comparison between this embodiment and the conventional example will be explained below. In the conventional example, input values with which a quantization error is 0 include 127 in addition to 0 and 255. In this conventional example, therefore, if uniform image data having a value of 127 is input data, the output image data is also uniform data filled with the first output value. In an inkjet printer in which the first output value is expressed by small ink droplets, local dot separation occurs because the landing accuracy of small ink droplets is low. This dot separation is visually perceived as image unevenness.

In contrast, in this embodiment the only input values with which a quantization error is 0 are 0 and 255. In this embodiment, therefore, quantization errors are not 0 for any input pixel values except for 0 and 255, so errors always occur for any other intermediate values. Hence, an output image is not filled only with the first output value. Also, since quantization errors are not 0 for any input values except for 0 and 255, no pseudo contour is produced in an intermediate density region of an image.

To eliminate conversion into output values having a quantization error of 0 in an intermediate region of input pixel values, it is only necessary to set (first threshold value)<(second threshold value)<(first output converted value)<(second output converted value)

as indicated by the set values of this embodiment. This eliminates input values, except for 0 and 255, with which a quantization error is 0.

Accordingly, a quantization error produced when a pixel of interest is quantized is propagated to and accumulated in adjacent pixels. This prevents the continuation of the first output pixel values in the quantized image data. Consequently, it is possible to prevent image unevenness resulting from the low landing accuracy of small ink dots, and improve the image quality.

The image quality is improved as described above. However, if the first output converted value and the second threshold value are close, the effect of preventing outputting of a uniform image made up of first output pixels (pixels having the first output converted value) decreases. That is, a region of the first output pixels having a certain spread is output, although the whole region is not filled with the first output pixels. In addition, if the first and second threshold values are close, second output pixels (pixels having the second output converted value) are produced while only few first output pixels are formed, resulting in an image having graininess.

This embodiment can prevent the above problem by setting the second threshold value to be substantially intermediate between the first threshold value and the first output value. That is, the second threshold value is so set that (second threshold value)≈{(first threshold value)+
(first output converted value)}/2 by which the effect and the problem described above are well balanced. This further enhances the effect of improving the image quality.

In the procedure shown in FIG. 1, the threshold value and input value are compared in steps 1004 and 1007. However, an input value may also be converted into an output value by using a lookup table (LUT). In this case, steps 1004, 1005, 1007, 1008, and 1010 are simultaneously executed by acquiring output values in accordance with the correspondence between input values and output values defined in the LUT. In this processing using the LUT, comparison with the threshold values is not particularly performed. However, since the input-output relationship as shown in FIG. 5 is defined in the LUT, the threshold values shown in FIG. 1 are substantially present even when the LUT is used.

Second Embodiment

The second embodiment can be practiced by the arrangements shown in FIGS. 8 to 11.

When quantization is performed by the error diffusion method of the above embodiment, an output image region of image data made up of pixels having input levels of 192 or more is almost entirely filled with first and second output pixels, and the image density is expressed by the ratio of the number of the first output pixels to the number of the second output pixels.

An inkjet printer prints the first and second output pixels by using different printing element groups, or by driving printing elements of the same printing element group under different driving conditions. In this case, the relative positional adjustment (registration) of pixels formed in accordance with the first and second output pixels is important in expressing the image density. This is so because if the first and second output pixels overlap each other, the ratio (coverage) of an area to which a coloring material is adhered to the area of a printing medium cannot be the original ratio supposed to be obtained, and the density becomes lower than the original density.

Accordingly, it is an object of this embodiment to reduce the influence of the relative positional relationship between the first and second output pixels in an output image.

Figure 6:
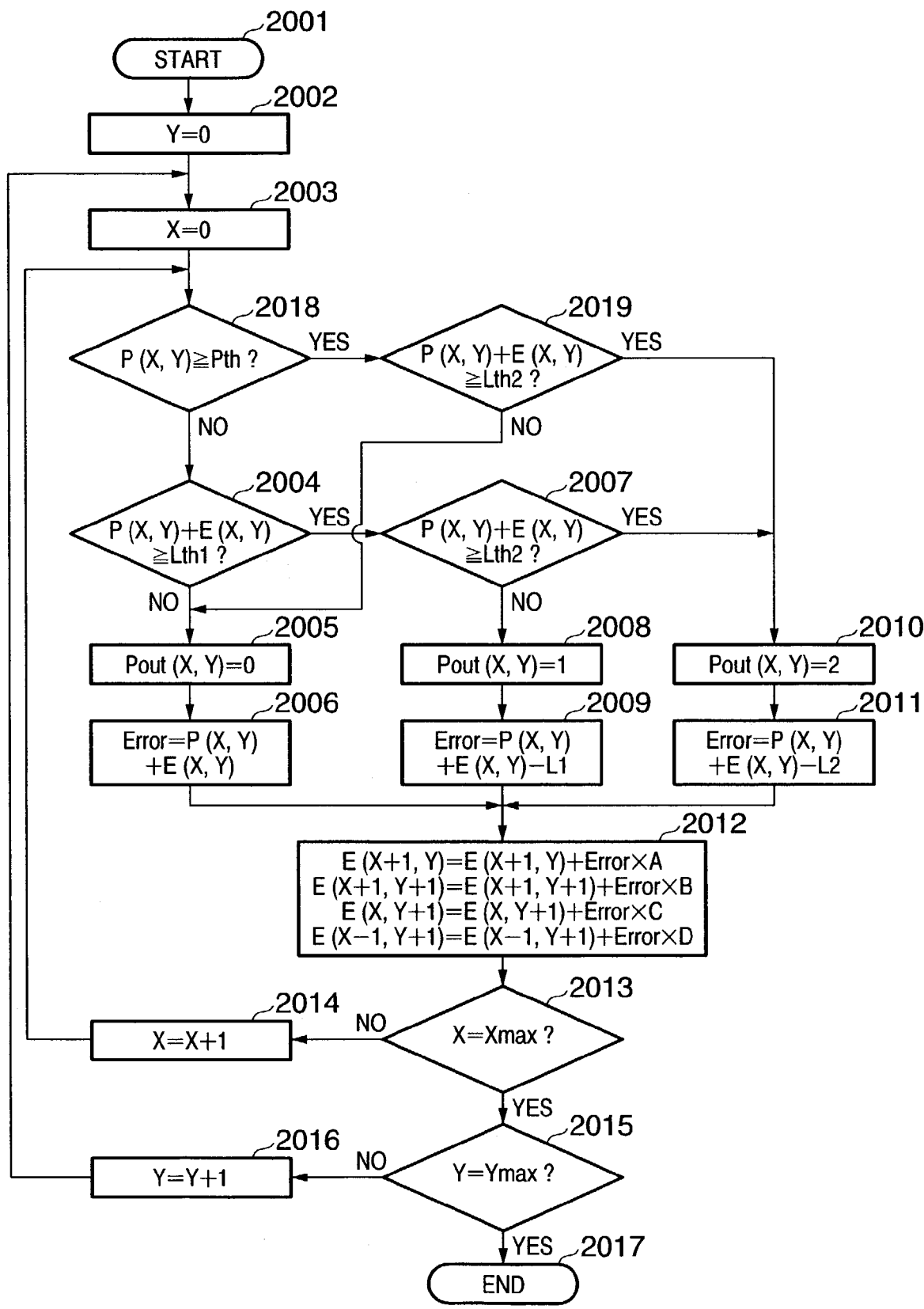
FIG. 6 is a flow chart for explaining the algorithm of ternarization used in the second embodiment of the present invention.

FIG. 6 is a flow chart for explaining the algorithm of ternarization used in this embodiment. This algorithm is a flow obtained by adding processes in steps 2018 and 2019 before the process in step 1004 of the algorithm shown in FIG. 1.

Referring to FIG. 6, steps 2001 to 2017 are similar to steps 1001 to 1017 shown in FIG. 1, so an explanation thereof will be omitted.

Step 2018 is a step of branching an error diffusion process in accordance with an input level P(X,Y) of a pixel of interest. In step 2018, the flow advances to step 2019 if comparison inequality P(X,Y)≧Pth is true, and advances to step 2004 if not. In this comparison inequality, the set value of a threshold value Pth is, e.g., 128. Pth≈L2/2 is appropriate as a condition for setting the threshold value Pth. L2 is a second output converted value. If an input image is a uniform image whose density is close to L2/2, the output image data is made up of equal numbers of second output pixels and blank pixels. Therefore, if an input becomes larger than this value, first output pixels start being output in place of blank pixels. Hence, L2/2 is the value of a boundary from which the relative positional relationship between first and second output pixels begins having influence on an output image.

Also, in the condition branching in step 2018, proceeding to the process in step 2019 without advancing to the process in step 2004 is equivalent to performing binarization using a second threshold value Lth2. That is, in step 2019, an input value P(X,Y)+E(X,Y) is compared with the second threshold value Lth2. If the input value is larger, the second output value is output. If the input value is smaller, a blank pixel (0th output value) is output.

More specifically, in the condition branching in step 2018, ternarization is performed using blank pixels and first and second output pixels if P(X,Y)<Pth, and binarization is performed using blank pixels and second output pixels if P(X,Y)≧Pt. Accordingly, for an input value with which the relative positional relationship between first and second output pixels has influence on an output image, processing not using first output pixels can be performed. Even when a ternary image thus generated is output from an inkjet printer, an image made up of both small and large ink dots is hardly printed, and this improves the image quality.

Other Embodiment

Although ternarization is performed in the above embodiments, quaternarization, quinarization, and N-level conversion may also be performed. If the printing position accuracy at the first output level is the only problem, the same relationship (first threshold value)<(second threshold value)<(first
output converted value)<(second output converted value)

as in the above embodiments is used.

Threshold values larger than the second threshold value can have relationships (second output converted value)<(third threshold
value)<(third output converted value) (third output converted value)<(fourth threshold value)<
(fourth output converted value)

((n−1)th output converted value)<(nth threshold
value)<(nth output converted value)

((N−2)th output converted value)<((N−1)th threshold
value)<((N−1)th output converted value)

where n is an integer from 3 (inclusive) to N−1 (inclusive).

The second effect of the present invention, i.e., elimination of a pseudo contour upon grayscale switching can be achieved by setting relationships (first threshold value)<(second threshold value)<(first
output converted value) (first output converted
value)<(third threshold value)<(second output
converted value) (second output converted
value)<(fourth threshold value)<(third output
converted value)

((n−2)th output converted value)<(nth threshold
value)<((n−1)th output converted value)

((N−3)th output converted value)<((N−1)th threshold
value)<((N−2)th output converted value)<((N−1)
th output converted value)

This can eliminate input values, except for 0 and 255, with which a quantization error is 0, thereby preventing a pseudo contour.

Figure 7:
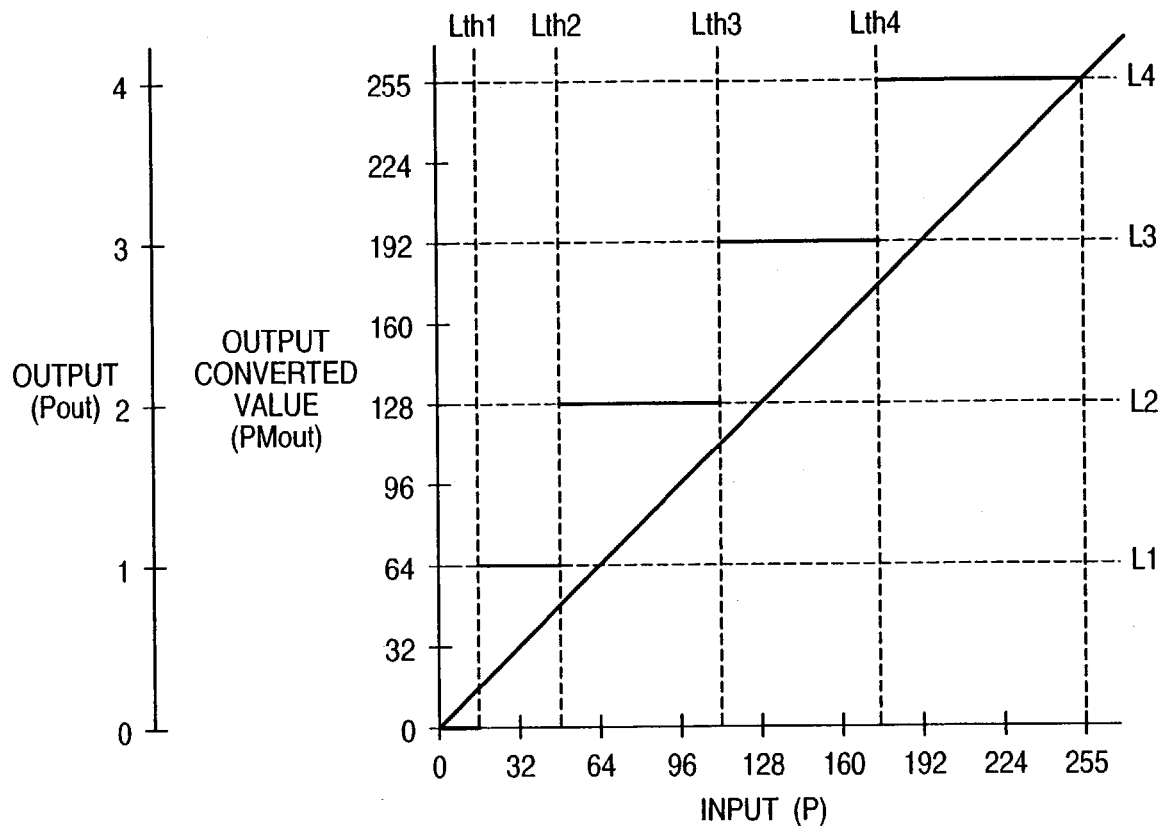
FIG. 7 is a graph for explaining the input-output relationship in quinarization according to the present invention.

FIG. 7 shows practical relationships between inputs, threshold values, and outputs of quinarization based on the above relationships.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a storage medium (or recording medium) recording program codes of software for implementing the functions of the above embodiments to a system or apparatus, and reading out and executing the program codes stored in the storage medium by a computer (or a CPU or MPU) of the system or apparatus. A main component for executing the program can be a host computer, and can also be a control computer incorporated into the body of a peripheral device such as a printer. Therefore, although the procedures of the embodiments are executed by a computer, this computer may also be a built-in computer of a printer. When this is the case, the procedures of the embodiments are executed by the printer.

In this case, the program codes read out from the storage medium implement the functions of the embodiments, and the program codes themselves and the storage medium storing these program codes constitute the invention.

Furthermore, besides the functions of the above embodiments are implemented by executing the readout program codes by the computer, the present invention includes a case where an operating system (OS) or the like running on the computer performs part or the whole of actual processing in accordance with designations by the program codes and thereby implements the functions of the above embodiments.

Furthermore, the present invention also includes a case where the program codes read out from the storage medium are written in a memory of a function expansion card inserted into the computer or of a function expansion unit connected to the computer, and, in accordance with designations by the program codes, a CPU or the like of the function expansion card or function expansion unit performs part or the whole of actual processing and thereby implements the functions of the above embodiments.

In the present invention as has been explained above, image data can be so quantized as to prevent close gathering of first-output-level pixels using small droplets. A pseudo contour produced between different output levels can also be eliminated.

In ternarization, the above effects can be further enhanced by setting the upper limit of an intermediate range to be substantially intermediate between the lower limit of the intermediate range and an output value with respect to the intermediate range.

If an input value is equal to or smaller than a predetermined value, N-level conversion is performed. If an input value is larger than the predetermined value, (N–1)-level conversion is performed. This prevents close gathering of first levels even when quantization into multilevel data is performed, thereby further enhancing the above effects.

Furthermore, high-quality images can be formed by an inkjet printing apparatus which prints images by using image data quantized by a quantization process having the above effects.

As many apparently widely different embodiments of the present invention can be made without departing from the spirit and scope thereof, it is to be understood that the invention is not limited to the specific embodiments thereof except as defined in the appended claims.

What is claimed is:

1. A quantization apparatus for performing a quantization process by using an error diffusion method, wherein said quantization apparatus prints each pixel of an image with ink droplets having at least two different sizes in accordance with an output value of quantized image data, comprising:
    converting means for converting a pixel value of interest containing a diffused error into an output value corresponding to a value range to which the pixel value of interest belongs; and
    diffusing means for diffusing, as an error, a difference between the output value converted by said converting means and the pixel value of interest to pixels neighboring the pixel of interest,
    wherein at least one intermediate range, except for a range including a maximum pixel value and a range including a minimum pixel value, does not contain any output value corresponding to the intermediate range,
    wherein an upper limit of at least one intermediate range is substantially median between a lower limit of the intermediate range and an output value corresponding to the intermediate range, and
    wherein the output value corresponding to the intermediate range is recorded with an ink droplet having a smaller size of the at least two different sizes.

2. A computer-readable storage medium on which is stored a computer program for allowing a computer to execute a quantization process using an error diffusion method, wherein each pixel of an image is printed with ink droplets having at least two different sizes in accordance with an output value of quantized image data, the program comprising the steps of:
    converting means for converting a pixel value of interest containing a diffused error into an output value corresponding to a value range to which the pixel value of interest belongs; and
    diffusing means for dispersing, as an error, a difference between the output value converted by said converting means and the pixel value of interest to pixels neighboring the pixel of interest,
    wherein at least one intermediate range, except for a range including a maximum pixel value and a range including a minimum pixel value, does not contain any output value corresponding to the intermediate range,
    wherein an upper limit of at least one intermediate range is substantially median between a lower limit of the intermediate range and an output value corresponding to the intermediate range, and
    wherein the output value corresponding to the intermediate range is recorded with an ink droplet having a smaller size of the at least two different sizes.

3. A quantization method using an error diffusion method, wherein each pixel of an image is printed with ink droplets having at least two different sizes in accordance with an output value of quantized image data, comprising:
    converting a pixel value of interest containing a diffused error into an output value corresponding to a value range to which the pixel value of interest belongs; and
    diffusing as an error, a difference between the converted output value and the pixel value of interest to pixels neighboring the pixel of interest,
    wherein at least one intermediate range, except for a range including a maximum pixel value and a range including a minimum pixel value, does not contain any output value corresponding to the intermediate range,
    an upper limit of at least one intermediate range is substantially median between a lower limit of the intermediate range and an output value corresponding to the intermediate range, and
    the output value corresponding to the intermediate range is recorded with an ink droplet having a smaller size of the at least two different sizes.

* * * * *